Jan. 3, 1939.　　　O. F. CARLSON　　　2,142,435
FLUID RESPONSIVE DEVICE

Filed May 1, 1936　　　4 Sheets-Sheet 1

Inventor:
Oscar F. Carlson
By: Mason Jackson Boxtere
Denmer
Attys.

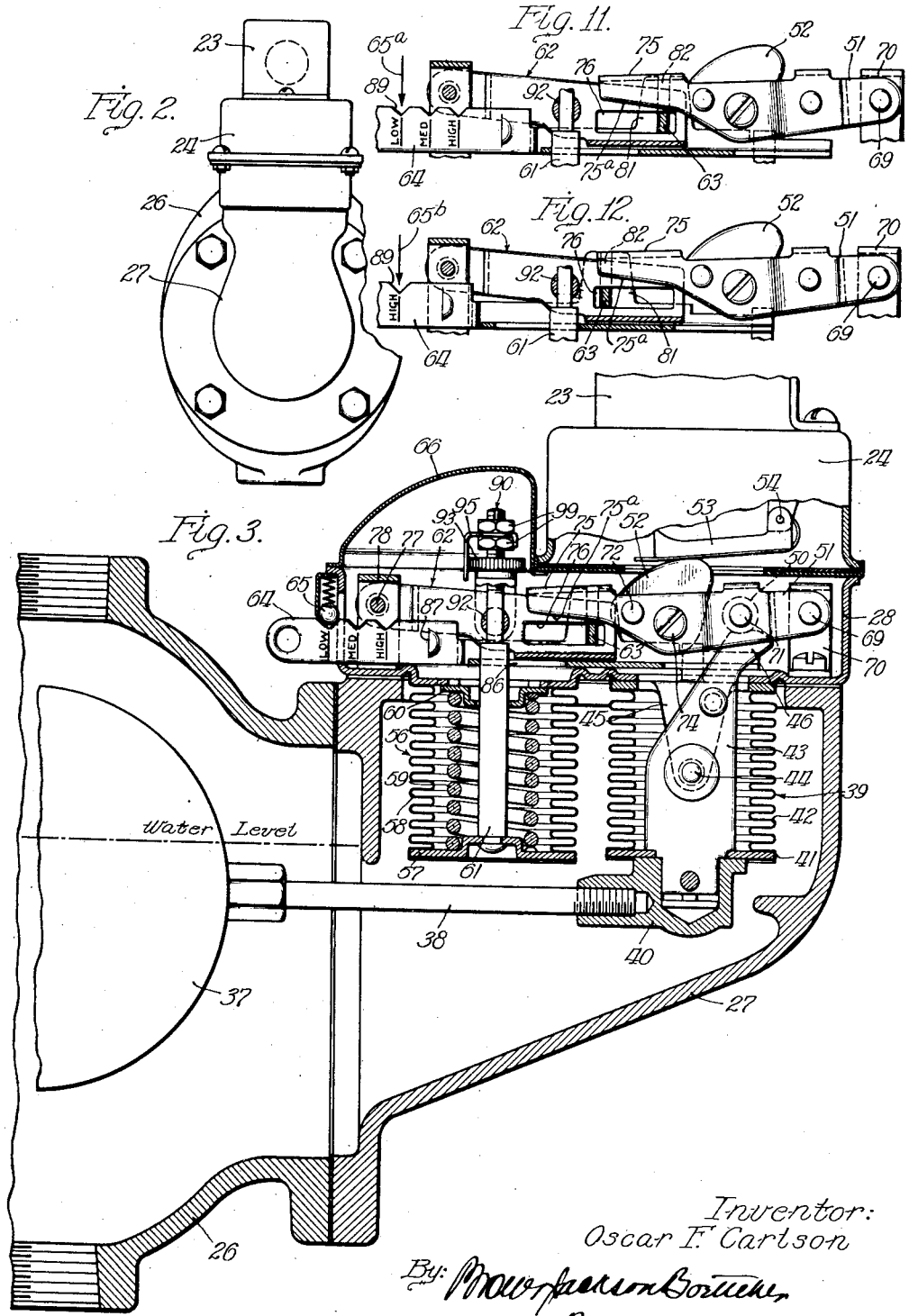

Jan. 3, 1939. O. F. CARLSON 2,142,435
FLUID RESPONSIVE DEVICE
Filed May 1, 1936 4 Sheets-Sheet 3
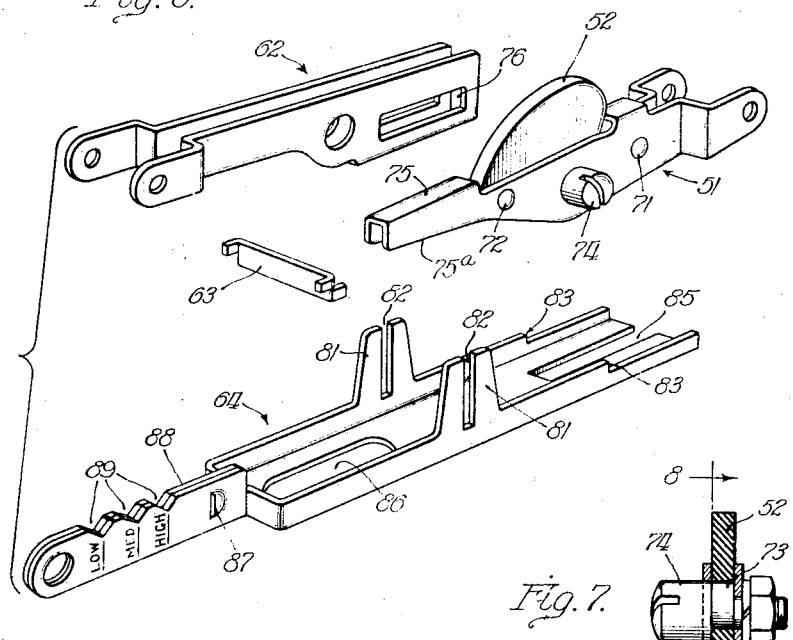
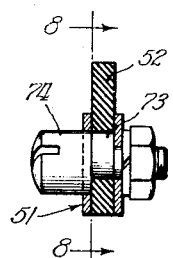
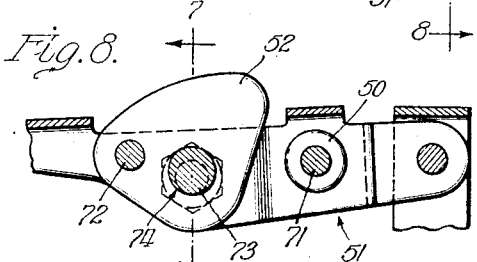
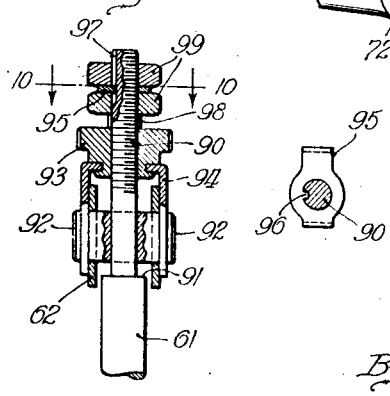
Inventor:
Oscar F. Carlson
By: [signature]
Attys.

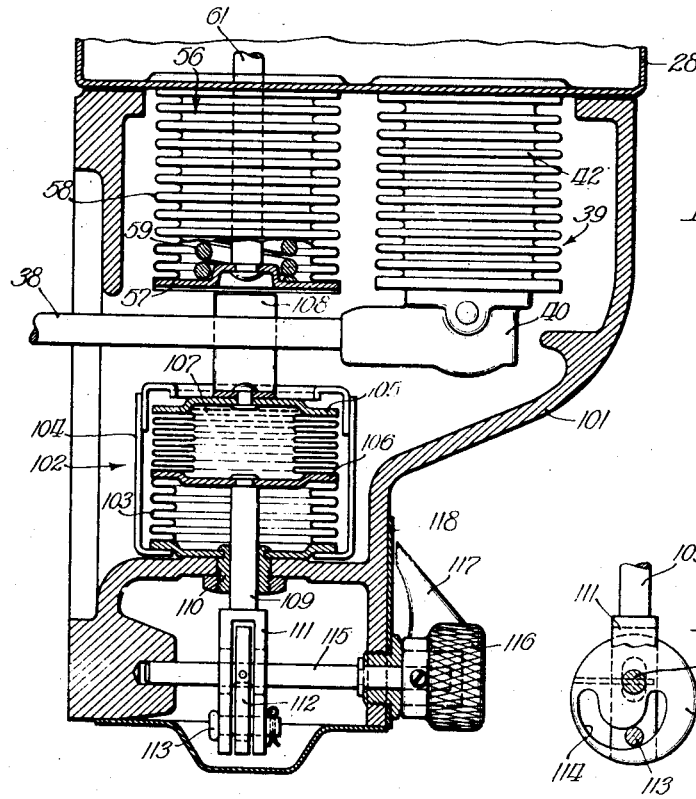
Fig. 13.
Fig. 15.
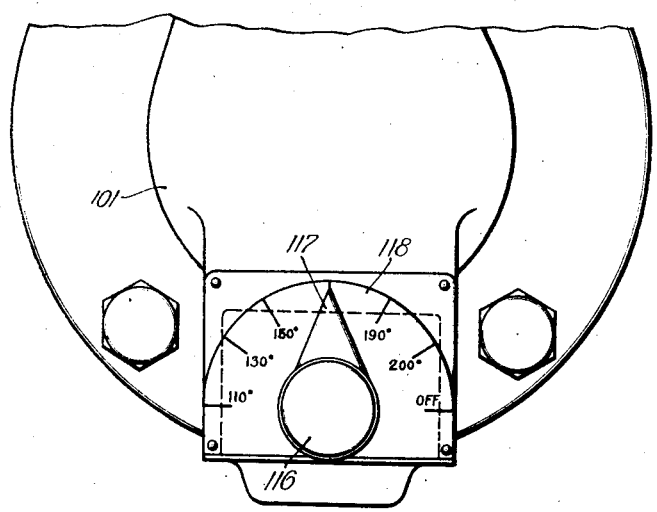
Fig. 14.
Inventor:
Oscar F. Carlson

Patented Jan. 3, 1939

2,142,435

UNITED STATES PATENT OFFICE 2,142,435

FLUID RESPONSIVE DEVICE

Oscar F. Carlson, Chicago, Ill., assignor of one-half to Oscar F. Carlson Company, Chicago, Ill., a corporation of Illinois, and one-half to Everett N. McDonnell, Chicago, Ill.

Application May 1, 1936, Serial No. 77,336

7 Claims. (Cl. 200—83)

My invention relates generally to control devices, and it has particular relation to devices responsive to variable characteristics, such as level, pressure and temperature of a liquid, for example, water in a boiler.

For a boiler, particularly of the type employed for household heating purposes, it is desirable to provide for full automatic control of the various factors entering into its operation. Reliance on manual control is then unnecessary and, when once started in operation, the boiler will continue to function properly for an indefinite period provided all of the controls operate in the intended manner.

There are three variables which may enter into the operation of a boiler and which it is desired to hold constant or substantially constant. These variables are the level of the water in the boiler, the pressure exerted on the inner walls of the boiler when it is making steam, and the temperature of the water in the boiler when it is not being used for heating purposes. It is desired to hold the water level and pressure in the boiler substantially constant when it is being operated, for example, during cold weather when the steam therefrom is distributed into radiators for heating purposes.

The boiler is often used during the summer months to provide hot water for household purposes only. For such operation it is undesirable to heat the water to a temperature which would produce steam, as for winter operation, but rather it is desired to maintain the water at a temperature somewhat below the boiling point, possibly in the neighborhood of 180° F. When operated in this manner, the pressure inside of the boiler will be substantially atmospheric pressure, and the variables entering into the operation of the boiler will then be the water level and the temperature of the water.

In many instances, an oil-fired boiler is used and for such an installation an electric motor is provided which is arranged to drive a blower. In order to shut down the boiler, the blower is stopped by deenergizing the motor. At this time the flow of oil to the burner is automatically cut off, and only a pilot flame is left. By controlling the connection of the motor to the power source in response to variations in water level, temperature, and pressure in the boiler, it is possible to prevent operation of the boiler under conditions which might be dangerous or beyond the range desired.

The object of my invention, generally stated, is to provide a liquid level, pressure and temperature responsive device for steam boilers and the like, which shall be simple and efficient in operation and which may be readily and economically manufactured and installed.

The principal object of my invention is to provide for independently controlling the functioning of a control device in accordance with a plurality of variable characteristics of a liquid, such as water, in a boiler.

An important object of my invention is to provide for independently operating an electric control switch from one circuit controlling position to another on the occurrence of either a predetermined level of the water or pressure in a boiler or the like.

A further object of my invention is to provide for independently operating an electric control switch from one circuit controlling position to another on the occurrence of either a predetermined level or temperature of the water in a boiler or the like.

Still another object of my invention is to provide for varying, in a plurality of different ranges, the pressure at which a pressure responsive device attached to a boiler or the like will operate a control device, such as an electric control switch from one control position to another.

Other objects of my invention will in part be obvious and, in part, appear hereinafter.

My invention, accordingly, is disclosed in the embodiments hereof shown in the accompanying drawings, and it comprises the features of construction, combination of elements and arrangement of parts which will be exemplified in the constructions hereinafter set forth, and the scope of the application of which will be indicated in the appended claims.

For a more complete understanding of the nature and scope of my invention, reference may be had to the following detailed description, taken in connection with the accompanying drawings, in which:

Figure 2 is a view in end elevation of the liquid level and pressure responsive device;

Figure 3 is a view, partly in section and partly in side elevation, showing the details of construction of the liquid level and pressure responsive device;

Figure 6 is an exploded view, in perspective, showing the construction of the various parts of the compound lever system;

Figure 7 is a view taken along the line 7—7 of Figure 8;

Figure 8 is a view taken along the line 8—8 of Figure 7;

Figure 9 is a sectional view showing the adjustable connection between the diaphragm and the pressure lever;

Figure 10 is a view, partly in section and partly in top plan, showing the arrangement of the index finger;

Figures 11 and 12 show different operating positions of the compound lever system;

Figure 13 is a view, partly in side elevation and partly in section, showing the construction details of another embodiment of the invention in which an "aquastat" is provided in addition to the water level and pressure responsive units;

Figure 14 is a fragmentary end elevation showing the adjusting dial for the "aquastat"; and Figure 15 is a view, partly in side elevation and partly in section, showing the linkage between the "aquastat" and the adjusting dial.

Figure 1:
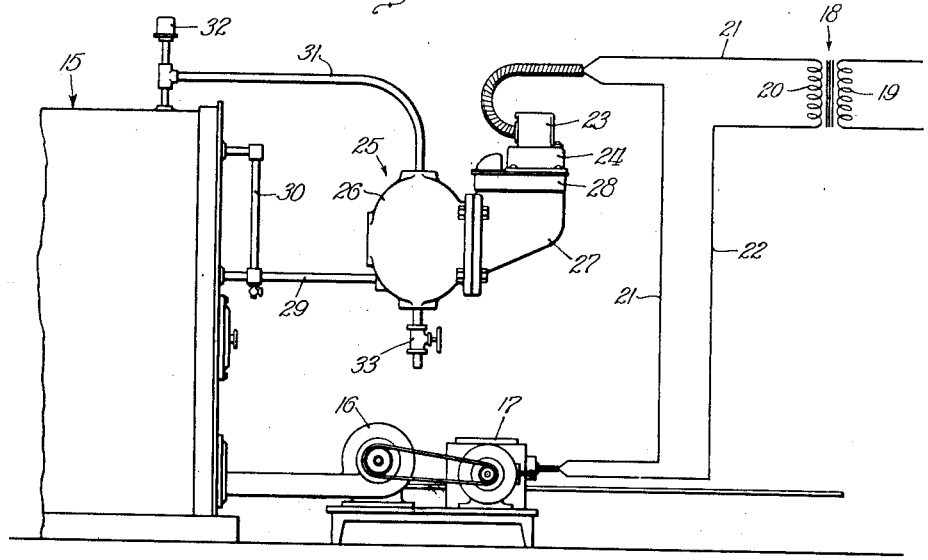
Figure 1 illustrates, diagrammatically, the arrangement of my novel liquid level and pressure responsive device for operation in connection with a steam boiler.

Although I have disclosed my invention for use in connection with a household boiler or heating unit, it will be understood that its application is not to be considered as limited thereto, but rather it may be used in any case where it is desired to maintain the boiler or heating unit in operation only so long as certain predetermined variable conditions remain at certain predetermined values. In general, it may be used for controlling the energization of a motor that is connected to drive the blower of an oil-fired boiler, the motor being controlled by means of a switch which is arranged to be opened in the event that the level of the water goes below a predetermined level, or the pressure exceeds a predetermined pressure, or the temperature of the water in the boiler exceeds a predetermined temperature.

In the event that the water in the boiler falls below a predetermined level, a float is arranged to operate a switch which is connected to control the energizing circuit for the blower motor. A signal may then be given to indicate that the level of the water has fallen to such an extent that it has been necessary to stop the motor, or a valve may be automatically opened to restore the water to the desired level.

In response to the increase of pressure in the boiler beyond a predetermined pressure, the switch is operated to deenergize the motor. As soon as the pressure is restored to the predetermined pressure, the switch will again be closed and the motor will again be energized.

In a modification of the invention, a temperature responsive mechanism or "aquastat" is provided which is arranged to operate through the pressure device for controlling the functioning of the switch. This device is arranged for operation only when the boiler is not operated under steaming conditions, or is not operated to generate steam for heating purposes. As soon as the temperature is raised to a predetermined value, for example to 180° F., the switch will be opened and the motor will be deenergized.

With a view to simplifying the control circuit for the motor and to provide a compact control device, a single control switch is arranged to be responsive to all three of these variable operating conditions. For this purpose, a compound lever system is provided which includes a main operating lever that is arranged to move the control switch from one circuit controlling position to another, or to move it from the open to the closed position. The main operating lever may be operated by means of a cam and lever assembly of the level responsive unit, or it may be operated by means of the pressure lever of the pressure responsive unit. The temperature responsive unit is arranged to operate through the pressure lever and the pressure responsive unit.

The pressure at which the control switch will be operated may be controlled over a relatively wide range. The pressure responsive device is connected to the pressure lever through a resilient connection, the degree of resiliency of which may be adjusted to correspondingly change the pressure at which the pressure responsive device will be operative. A further adjustment may be provided by varying the connection between the pressure lever and the main operating lever. This adjustment is provided for external operation so that three ranges of operation, namely low, medium and high, are available.

The temperature at which the "aquastat" will be responsive may be adjusted so that the temperature of the water in the boiler for household purposes may be kept at any desired temperature within its range of adjustment. This control is effected by changing the degree of compressibility of the expansible medium in the "aquastat".

Referring now particularly to Figure 1 of the drawings, it will be observed that the reference character 15 designates, generally, a steam boiler of the type which may be used for the heating of residences and the like. The boiler 15 may be of the oil-fired type, having a blower 16 which is arranged to be driven by means of a motor 17. The motor 17 may be an electric motor which is arranged to be energized by means of a transformer, shown generally at 18, having a primary winding 19 for connection to a suitable source of alternating current, and a secondary winding 20 which may be connected by means of conductors 21 and 22 to the motor 17, as illustrated. The sections of the conductor 21 are connected into a terminal box 23 which is mounted on top of a switch housing 24 in which a switch may be mounted for controlling the connection of the section of the conductor 21. Since the construction of the switch in the switch housing 24 forms no part of this invention, and, further, since any suitable switch, well known to those skilled in the art, may be used, a detailed description thereof will not be set forth herein. The switch in the switch housing 24 is arranged to be controlled by means of a liquid level and pressure responsive device, shown generally at 25, and which comprises a main float chamber 26 and an auxiliary float chamber 27. The liquid level and pressure responsive device 25 is arranged to operate through a lever system, which will be described in detail hereinafter, that may be enclosed in a lever housing 28 mounted on top of the auxiliary float chamber 27, as shown.

The liquid level and pressure responsive device 25 may be connected to the boiler 15 by means of a pipe 29 at the desired water level which may be visually indicated by means of a water gauge 30. A return connection to the boiler 15 may be provided by means of the pipe 31 which may be connected into the pipe carrying the pop valve 32.

Reference may now be had to Figure 3 of the drawings where the details of construction of the liquid level and pressure responsive device are illustrated. Inside of the main float chamber 26 a float 37 is positioned for movement in accordance with the change in level of the water therein. The float 37 is mounted on a connecting rod 38 for transmitting movement thereof to a cam lever and bellows assembly, shown generally at 39. The rod 38 is threaded into a float fitting 40 that may be secured, for example by soldering, to the under side of a washer 41. The washer 41 is supported by means of a bellows 42 which is interposed between it and the under side of the lever housing 28. By means of the cam lever and bellows assembly 39, provision is made for transmitting the movement of the float 37 exteriorly of the float chamber to a mechanism which is preferably operated out of contact with the steam and water from the boiler 15. Mounted on the float fitting 40 is a cam lever 43 which is pivotally mounted on a shaft 44 that is carried by means of a fulcrum member 45 depending from the bottom of the lever housing 28, as illustrated.

The upper end 46 of the cam lever 43 is provided with a cam surface for engaging a roller 50 that is mounted on a main operating lever 51. By means of a cam 52, preferably composed of heat insulating material, the movement of the main operating lever 51 is transmitted to a switch operating arm 53, pivoted at 54, which is arranged to control the operation of the switch mounted in the switch housing 24 for opening and closing the energizing circuit for the motor 17, as set forth hereinbefore.

Within the auxiliary float chamber 27, a pressure bellows assembly, shown generally at 56, is provided which includes a diaphragm 57 that is flexibly connected by means of a bellows 58 to the under side of the lever housing 28. The diaphragm 57 is biased downwardly by means of a compression spring 59 which is interposed between the upper surface of the diaphragm 57 and the under surface of a washer 60 disposed on the under surface of the lever housing 28. The movement of the diaphragm 57 is transmitted exteriorly of the float chamber 27 by means of a rod 61 which is connected to adjustably control the position of a pressure lever 62, as will be set forth hereinafter. By means of a link 63 the pressure lever 62 is also arranged to control the position of the main operating lever 51. The relative operating position of the link 63 with respect to the main operating lever 51 may be changed by means of a pressure adjusting lever 64 with which a spring-pressed ball 65 is arranged to cooperate for holding it in any one of three positions corresponding to low, medium, or high pressure ranges, as indicated, at which it is desired to operate the boiler 15. A cap 66 is provided for covering the left hand end of the lever housing 28.

Figure 4:
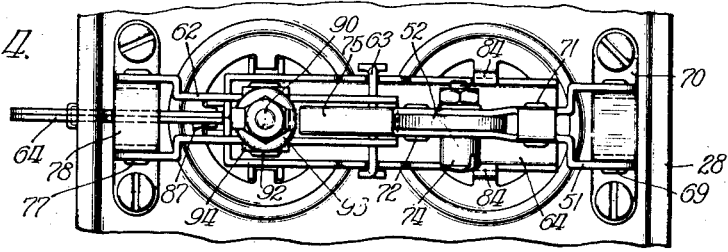
Figure 4 is a top plan view of the compound lever assembly.
Figure 5:
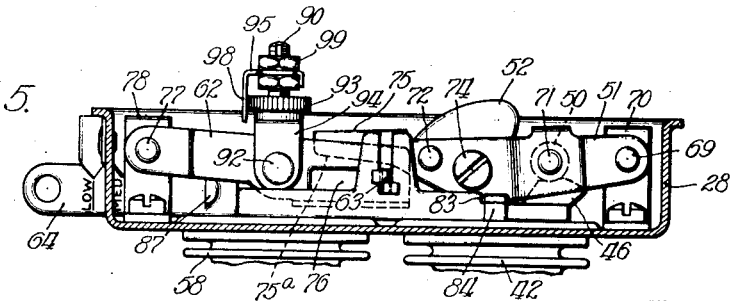
Figure 5 is a view in side elevation of the lever assembly shown in Figure 4.

Referring now particularly to Figures 4, 5 and 6 of the drawings, it will be observed that the main operating lever 51 is formed, somewhat channel-like in shape, by means of a stamping operation, and is composed preferably of brass and pivotally mounted at 69 on a support member 70 which is secured to the lever housing 28. The roller 50 is rotatably mounted between the side members of the main operating lever 51 by means of a shaft 71 extending therethrough. The cam 52 is pivotally mounted between the side members of the main operating lever 51 on a pin 72, and a cam 73 (Figures 7 and 8) integrally formed with a bolt 74 is provided for adjusting the position thereof relative to the main operating lever 51 to, in turn, adjust the movement of the switch operating arm 53. As shown, the lever 51 is provided with a shank 75 for variable engagement along its upwardly inclined under side 75a with the top of link 63. The link 63 is slidably mounted in slots 76 in the pressure responsive lever 62, which is preferably formed of brass by means of a stamping operation. The pressure responsive lever 62 is pivotally mounted at 77 on a support member 78 which is secured to the bottom of the lever housing 28.

In order to move the connecting link 63 along the under surface of the shank 75 of the main operating lever 51 and in the slots 76 for varying the relative movement of the pressure responsive lever 62 with respect to the main operating lever 51, the pressure adjusting lever 64, Figure 6, is provided with upstanding ears 81 having slots 82 in which the link 63 can move in a vertical direction as illustrated. The pressure adjusting lever 64 is formed preferably of brass by means of a stamping operation, and is provided at the right-hand end with shoulders 83 for engagement with stops 84, Figure 5, comprising lugs integrally formed and raised from the bottom of the lever housing 28. The pressure adjusting lever 64 is provided with a slot 85 through which the cam lever 43 projects. Near the center of the pressure adjusting lever 64 a closed slot 86 is provided through which the rod 61, attached to the diaphragm 57, may move. The slot 86 also forms a stop for limiting the movement of the pressure adjusting lever 64. A stop 87, comprising an upstruck lug, Figure 5, may also be employed if desired to provide a stop for limiting the movement of the adjusting lever 65 outwardly of the lever housing 28. The left hand end of the pressure adjusting lever 64 is formed into an arm 88 having notches 89 along the upper edge thereof corresponding to the different pressure ranges, low, medium, and high, for which the liquid level and pressure responsive device 25 may be adjusted for operation. The spring-pressed ball 65, Figure 3, is arranged to engage any one of the slots 89 for securing the pressure adjusting lever 64 in any corresponding position.

As shown more clearly in Figures 9 and 10 of the drawings, the upper end 90 of the rod 61 is reduced in section and is provided with a shoulder 91 which limits the upward movement of the rod 61 on engagement with a pin 92 in which the upper portion 90 is slidably mounted. It will be observed that the upper end 90 is threaded and has a knurled adjusting nut 93 threaded thereon for moving the rod 61 relative to the pin 92 through the agency of a yoke 94 rotatably secured to the nut 93 at its upper end and secured to the pin 92 at its lower end. An index washer 95 having an inwardly extending tooth 96 for engaging a slot 97 in the upper portion 90 of the rod 61 is provided, and a downwardly extending finger 98 for frictional engagement with the knurled nut 93 to hold it in any position to which it may be adjusted. Lock nuts 99 are positioned above and below the washer 95, as illustrated, for securing it in any desired position.

It will be observed that the pressure bellows assembly 56 may be adjusted to be effective for operating the control switch in a plurality of different pressure ranges. As shown herein, there are three pressure ranges. In each of these ranges the relative movement of the diaphragm 57 for compressing the spring 59 may be adjusted by means of the knurled nut 93. The maximum pressure for any range to which the diaphragm 57 may be adjusted for response is limited by the shoulder 91 on its engagement with the pin 92. It is therefore not readily possible to alter the adjustment of the pressure responsive mechanism to render it operative beyond a predetermined maximum pressure which is inherent in the construction of the device. By moving the pressure adjusting lever 64 in or out, the effective length of the work arm of the pressure responsive lever 62 is varied for operating the main operating lever 51 to move the control switch from one operating position to another; that is, when the pressure adjusting lever 64 is moved to the left as far as is possible to correspond to the "high" pressure setting, the effective length of the work arm is comparatively short, and as a result, it is necessary to apply a greater pressure to the diaphragm 57 for compressing the spring 59 and moving the main operating lever 51 in a sufficient amount to effect the operation of the control switch. In like manner, if the pressure adjusting lever 64 is moved to the right as far as possible, to a position corresponding to the "low" pressure position, the effective length of the work arm of the pressure responsive lever 62 will be considerably increased, and, as a result, a lesser pressure is required to effect sufficient movement in the main operating lever 51 for operating the control switch from the one circuit controlling position to the other.

The following table indicates the various approximate pressures in pounds per square inch required to effect the operation of the control switch for the different ranges or settings of the pressure adjusting lever 64 of a device which I have constructed and tested. The "top", "middle", and "bottom" notations refer to the various positions which the knurled adjusting nut 93 may assume on the threaded upper portion 90 of the rod 61, while the "low", "medium", and "high" notations refer to the different positions of the adjusting lever 64.

|         | Low | Medium | High |
|---------|-----|--------|------|
| Top     | 1   | 2      | 3    |
| Middle  | 3   | 4      | 5½   |
| Bottom  | 5   | 7½     | 10   |

Two different operating positions of the compound lever assembly are shown in Figures 11 and 12. In Figure 11 the pressure adjusting lever 64 is illustrated in the low pressure position, the action of the spring-pressed ball 65 being indicated by the arrow 65a, while in Figure 12 it is shown in the high pressure position and the action of the spring-pressed ball 65 is indicated by the arrow 65b. The movement of the pressure adjusting lever 64 from one of these positions to the other changes the point of contact of the link 63 with the upwardly inclined under surface 75a of the shank 75 which forms a part of the main operating lever 51 and, consequently, the effective length of the lever arm formed thereby is shortened.

In the low pressure position, shown in Figure 11, only a slight upward movement of the rod 61, caused by a slight upward movement of the diaphragm 57, Figure 3, is necessary to move the link 63 into engagement with the lowest point of the upwardly inclined under surface 75a of the main operating lever 51. Moreover, the horizontal distance between the link 63 and the pivot point 69 of the main operating lever 51 is a minimum in this position. On the occurrence of the low pressure for which the device is adjusted to be responsive the spring 59 will be compressed slightly and the cam 52 will be immediately moved upwardly sufficiently far to actuate the switch operating arm 53 from one operating position to the other.

A considerably greater pressure must be applied to the diaphragm 57, Figure 3, when the pressure adjusting lever 64 is in the high position, shown in Figure 12, in order to move the switch operating arm 53 from one operating position to another. This is due to the fact that the spring 59 must be compressed to a greater extent than for the low pressure setting to cause the link 63 to engage the highest point of the upwardly inclined under surface 75a. Moreover, the pressure applied to the diaphragm must compress the spring 59 still further to cause the same movement of the cam 52 as for the low pressure setting, since the horizontal distance between the link 63 and the pivot point 69 is increased, thereby increasing the effective length of the lever arm of the main operating lever 51.

It will then be observed that, with the same spring 59 or adjustment thereof by the nut 93, a relatively wide range of pressure response is available merely by adjusting the horizontal position of the pressure adjusting lever 64. Not only is the distance required to be traveled by the link in engaging the under surface 75a of the main operating lever 51 increased for the high pressure adjustment, but also the extent of its movement after engagement is increased due to the greater distance between it and the pivot point 69 to effect sufficient movement of the cam 52 for operating the switch arm 53 from one position to the other. For the medium pressure setting there will be a proportionate change in the effect of the linkage between the rod 61, the position of which is controlled by the diaphragm 57, and the cam 52 for causing the operation of the switch arm 53.

In some instances, as stated hereinbefore, it is desirable to provide for controlling the operation of the motor 17 when the boiler 15 is operated during the summer months for heating water for household purposes only. For this purpose the embodiment of the invention disclosed in Figures 13, 14 and 15 is provided. As there shown, a modified form of auxiliary float chamber 101 is provided for mounting on the main float chamber 26. In addition to the float and pressure assemblies 39 and 56, an "aquastat" assembly, shown generally at 102, is provided which comprises a bellows 103 mounted in a framework 104 at the bottom of the auxiliary float chamber 101. Top and bottom plates 105 and 106 are provided in spaced relation at the upper end of the bellows 103 as shown, and are connected thereto as by soldering to provide a liquid-tight seal. Between the plates 105 and 106 a liquid 107, such as alcohol, having a relatively large temperature coefficient of cubical expansion, is provided. A substantially U-shaped member 108 is secured to the upper plate 105 for engagement with the under side of the diaphragm 57. The connecting rod 38 for the float 37 is positioned between the upwardly extending arms of the U-shaped member 108. It will be understood that the diaphragm 57 will be moved in accordance with the movement of the upper plate 105 in response to change in temperature for effecting the operation of the control switch in a manner corresponding to the operation thereof in accordance with the movement of the diaphragm 57 in response to pressure changes.

In order to render the "aquastat" 102 responsive to different temperatures, the lower plate 106 is supported by means of a rod 109 positioned in a bushing 110 in the wall of the auxiliary float chamber 101, as illustrated. The lower end of the rod 109 terminates in a clevis 111 which is arranged to be connected to an adjusting cam 112 by means of a pin 113. The cam 112 is provided with a circular eccentrically disposed slot 114 in which the pin 113 is adapted to slide for moving the rod 109 and the bottom plate 106 in a vertical direction. Since the pin 113 will always be at the bottom of the circular slot 114, an effective means is provided for supporting the downward thrust of the rod 109. The cam 112 is mounted for rotation with a shaft 115 for exterior adjustment by means of a knob 116 having a pointer 117 for indicating on a scale 118 the temperature at which the "aquastat" 102 will be effective to operate the control switch to the circuit opening position for deenergizing the motor 17.

Since the expansive force of the liquid 107 in the aquastat 102 is relatively great, the actual setting of the pressure responsive device will be of substantially no moment. When the boiler 15 is to be operated for the production of steam for heating purposes, the knob 116 may be turned to the "off" position, so that only the pressure responsive mechanism will be effective to control the operation of the control switch. When the boiler 15 is used for heating water only for household purposes, the knob 116 may be adjusted to a position corresponding to the temperature at which it is desired to maintain the water.

Since certain further changes may be made in the foregoing constructions, and different embodiments of the invention may be made without departing from the scope thereof, it is intended that all matter shown in the accompanying drawings or disclosed in the foregoing description shall be interpreted as illustrative and not in a limiting sense.

I claim as my invention:

1. A device for responding to variable characteristics of a liquid comprising, in combination, a float chamber disposed to be operatively connected to a container of a liquid under pressure, a float in said chamber movable in accordance with change in level of the liquid, a cam lever and bellows assembly for translating the movement of said float exteriorly of said float chamber, a diaphragm in said chamber disposed to be moved in accordance with change in pressure, a bellows interconnecting said diaphragm and said chamber, a spring interposed between said diaphragm and said chamber for biasing said diaphragm against pressure, a rod secured to said diaphragm and extending outside of said chamber through said bellows, an electric control switch disposed to be operated from one circuit controlling position to another, a main operating lever disposed to translate the movement of said cam lever to said control switch, and a pressure responsive lever disposed to translate the movement of said rod to said main operating lever, whereby said control switch is operated from one position to the other in response to change either in level or pressure in said container.

2. A device for responding to variable characteristics of a liquid comprising, in combination, a float chamber disposed to be operatively connected to a container of a liquid under pressure, a float in said chamber movable in accordance with change in level of the liquid, a cam lever and bellows assembly for translating the movement of said float exteriorly of said float chamber, a diaphragm in said chamber disposed to be moved in accordance with change in pressure, a bellows interconnecting said diaphragm and said chamber, a spring interposed between said diaphragm and said chamber for biasing said diaphragm against pressure, a rod secured to said diaphragm and extending outside of said chamber through said bellows, an electric control switch disposed to be operated from one circuit controlling position to another, a main operating lever disposed to translate the movement of said cam lever to said control switch, a pressure responsive lever disposed to translate the movement of said rod to said main operating lever, and means for adjusting the position of said rod relative to said pressure responsive lever to change the tension of said spring for rendering said diaphragm responsive to different pressures corresponding to different spring tensions, whereby said control switch is operated from one position to the other in response to change either in level or pressure in said container.

3. A device for responding to variable characteristics of a liquid comprising, in combination, a float chamber disposed to be operatively connected to a container of a liquid under pressure, a float in said chamber movable in accordance with change in level of the liquid, a cam lever and bellows assembly for translating the movement of said float exteriorly of said float chamber, a diaphragm in said chamber disposed to be moved in accordance with change in pressure, a bellows interconnecting said diaphragm and said chamber, a spring interposed between said diaphragm and said chamber for biasing said diaphragm against pressure, a rod secured to said diaphragm and extending outside of said chamber through said bellows, an electric control switch disposed to be operated from one circuit controlling position to another, a main operating lever disposed to translate the movement of said cam lever to said control switch, a pressure responsive lever operatively connected to said rod for translating the movement thereof to said main operating lever, and means for adjusting the connection between said pressure responsive lever and said main operating lever for rendering said diaphragm effective to operate said control switch in different pressure ranges, whereby said control switch is operated from one position to the other in response to change either in level or pressure in said container.

4. A device for responding to variable characteristics of a liquid comprising, in combination, a float chamber disposed to be operatively connected to a container of a liquid under pressure, a float in said chamber movable in accordance with change in level of the liquid, a cam lever and bellows assembly for translating the movement of said float exteriorly of said float chamber, a diaphragm in said chamber disposed to be moved in accordance with change in pressure, a bellows interconnecting said diaphragm and said chamber, a spring interposed between said diaphragm and said chamber for biasing said diaphragm against pressure, a rod secured to said diaphragm and extending outside of said chamber through said bellows, an electric control switch disposed to be operated from one circuit controlling position to another, a main operating lever disposed to translate the movement of said cam lever to said control switch, a pressure responsive lever operatively connected to said rod for translating the movement thereof to said main operating lever, means for adjusting the position of said rod relative to said pressure responsive lever to change the tension of said spring for rendering said diaphragm responsive to different pressures corresponding to different spring tensions, and means for adjusting the connection between said pressure responsive lever and said main operating lever for changing the range of pressure in which said diaphragm is effective to operate said control switch, whereby said control switch is operated from one position to the other in response to change either in level or pressure in said container.

5. A device for responding to variable characteristics of water in a boiler or the like comprising, in combination, a float chamber disposed to be operatively connected to the boiler, a float in said chamber movable in accordance with change in level of the water, a bellows in said chamber, a fluid sealed in said bellows disposed to expand with increase in temperature of the water, control means disposed to be operated in response to the occurrence of a predetermined level or temperature of the water, and means operatively connecting said float and bellows with said control means.

6. A device for responding to variable characteristics of water in a boiler or the like comprising, in combination, a float chamber disposed to be operatively connected to the boiler, a float in said chamber movable in accordance with change in level of the water, a pair of spaced apart plates in said chamber, a bellows interconnecting said plates, a fluid sealed in said bellows disposed to expand with increase in temperature of the water, means for adjustably mounting one of said plates in accordance with different temperatures of the water, an electric control switch disposed to be operated from one circuit controlling position to another on occurrence of a predetermined level or temperature of the water, and means operatively connecting said float and the other of said plates with said control switch.

7. A device for responding to variable characteristics of water in a boiler or the like comprising, in combination, a float chamber disposed to be operatively connected to the boiler, a float in said chamber movable in accordance with change in level of the water, a diaphragm resiliently mounted in said chamber and movable in accordance with change in pressure, a bellows in said chamber, a fluid in said bellows disposed to expand with increase in temperature of the water, an electric control switch disposed to be operated from one circuit controlling position to another on the occurrence of a predetermined level or pressure or temperature of the water, and means operatively connecting said float and diaphragm and bellows with said control switch, said bellows acting through said diaphragm.

OSCAR F. CARLSON.